United States Patent
Yen (10) Patent No.: US 7,970,130 B2
(45) Date of Patent: Jun. 28, 2011

(54) LOW-LATENCY METHOD AND APPARATUS OF GHASH OPERATION FOR AUTHENTICATED ENCRYPTION GALOIS COUNTER MODE

(75) Inventor: Chih-Hsu Yen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 949 days.

(21) Appl. No.: 11/858,906

(22) Filed: Sep. 21, 2007

(65) Prior Publication Data
US 2008/0279368 A1 Nov. 13, 2008

(30) Foreign Application Priority Data
May 10, 2007 (TW) .............................. 96116623 A (51) Int. Cl.
*H04K 1/00* (2006.01)
*H04L 9/00* (2006.01)
*H04L 1/00* (2006.01)
(52) U.S. Cl. .......................................... 380/28; 726/11
(58) Field of Classification Search .................... 380/28, 380/277; 726/11; 713/171
See application file for complete search history.

(56) References Cited

U.S. PATENT DOCUMENTS
2003/0106014 A1* 6/2003 Dohmen et al. ............. 714/785
2006/0126835 A1* 6/2006 Kim et al. ..................... 380/44
2008/0240423 A1* 10/2008 Gueron et al. ................ 380/28

OTHER PUBLICATIONS

A. Halbutoğullari; Mastrovito Multiplier for General Irreducible Polynomials; Springer-Verlag, Berlin, 1999; pp. 498-507.*
C. Paar, "Efficient VLSI Architecures for Bit-Parallel Computation in Galois Field," Ph. D. Thesis, Institutes for Experimental Mathematics, University of Essen, Germany, Jun. 1994.
Federal Information Processing Standards Publication 197, Nov. 26, 2001, Announcing the Advanced Encryption Standard(AES).
High Speed Architecture for Galois/Counter Mode of Operation (GCM), Bo Yang, Sambit Mishra, Ramesh Karri, ECE Department, Report 2005/146, Jun. 2005.
High-Speed Hardware Architectures for Authenticated Encryption Mode GCM, Akashi Satoh, ISCAS 2006, pp. 4831-4834.

* cited by examiner

*Primary Examiner* — Saleh Najjar
*Assistant Examiner* — Monjour Rahim (57) ABSTRACT

Disclosed is a low-latency method and apparatus of GHASH operation for authenticated encryption Galois Counter Mode (GCM), which simultaneously computes three interim values respectively yielded from the additional authenticated data A, the ciphertext C, and the hash key H defined in the GCM. Then, the output of the GHASH operation may be derived. Assuming that A has m blocks and C has n blocks, this disclosure performs the GHASH operation with max {m,n}+1 steps. The input order for the additional authenticated data A and the ciphertext C may be independent. A disordered sequence for the additional authenticated data A and the ciphertext C may also be accepted by this disclosure. This allows the applications in GCM to be more flexible.

16 Claims, 5 Drawing Sheets

LOW-LATENCY METHOD AND APPARATUS OF GHASH OPERATION FOR AUTHENTICATED ENCRYPTION GALOIS COUNTER MODE

FIELD OF THE INVENTION

The present invention generally relates to a low-latency method and apparatus of GHASH operation for authenticated encryption Galois Counter Mode (GCM).

BACKGROUND OF THE INVENTION

Galois Counter Mode (GCM) is an operation mode for the authenticated encryption block cipher system. The main feature of GCM is that GCM is fast, and provides confidentiality and integrity. GCM-Advanced Encryption Standard (GCM-AES) is among the most commonly seen, and is often applied to high speed transmission environment.

The data encryption of GCM is accomplished by a Counter (CTR) mode, and the authentication is achieved by a universal hash function based on Galois Field (GF). The authenticated encryption has four inputs, namely, secret key K, initialization vector IV, plaintext P, and additional authenticated data (ADD) A. P is divided into 128-bit blocks, expressed as $\{P_1, P_2, \ldots, P_n^*\}$, and A is divided into 128-bit blocks, expressed as $\{A_1, A_2, \ldots, A_m^*\}$, where blocks $P_n^*$ and $A_m^*$ are shorter than 128 bits.

The authentication and encryption has two outputs, namely, ciphertext C and authentication tag T. The ciphertext C has the same length with plaintext P, and the length of authentication tag T is denoted as t. The two outputs C and T are obtained via the following procedures:

$$H = E(K, 0^{128}) \quad (1)$$

$$Y_0 = \begin{cases} IV\|0^{31}1 & \text{if } len(IV) = 96 \\ GHASH(H, \{\}, IV) & \text{otherwise} \end{cases}$$

$$Y_i = incr(Y_{i-1}) \text{ for } i = 1, \ldots, n$$

$$C_i = P_i \oplus E(K, Y_i) \text{ for } i = 1, \ldots, n-1$$

$$C_n^* = P_n^* \oplus MSB_u(E(K, Y_n))$$

$$T = MSB_t(GHASH(H, A, C) \oplus E(K, Y_0))$$

where E(K,X) denotes the block cipher encryption of the value X with the key K. $MSB_t(S)$ returns the bit string containing only the leftmost t bits of S. { } represents the empty bit string, whose length is zero. $0^n$ denotes an n-bit zero sequence. The function incr( ) represents treating the least significant 32 bits on the right as a non-negative integer, adding 1, and then performing the modulo operation mod $2^{32}$. In other words, $incr(F\|I)=F\|(I+1) \mod 2^{32}$.

GHASH function is an operation of GCM. The function has three inputs, and generates a 128-bit hash value. The three inputs are A, C and H, where H is the value obtained by using the secret key K to encrypt the all-zero blocks. The following equation describes the output $X_i$ in i-th step of GHASH function.

$$X_i = \begin{cases} 0 & \text{for } i = 0 \\ (X_{i-1} \oplus A_i) \cdot H & \text{for } i = 1, \ldots, m-1 \\ (X_{m-1} \oplus (A_m^*\|0^{128-v})) \cdot H & \text{for } i = m \\ (X_{i-1} \oplus C_{i-m}) \cdot H & \text{for } i = m+1, \ldots, m+n-1 \\ (X_{m+n-1} \oplus (C_n^*\|0^{128-u})) \cdot H & \text{for } i = m+n \\ (X_{m+n} \oplus (len(A)\|len(C))) \cdot H & \text{for } i = m+n+1 \end{cases} \quad (2)$$

In equation (2), v is the bit length of block $A_m^*$, $\oplus$ is the addition over $GF(2^{128})$, and the multiplication is defined in $GF(2^{128})$. A∥B represents the concatenation of two bit strings A and B.

Figure 1:
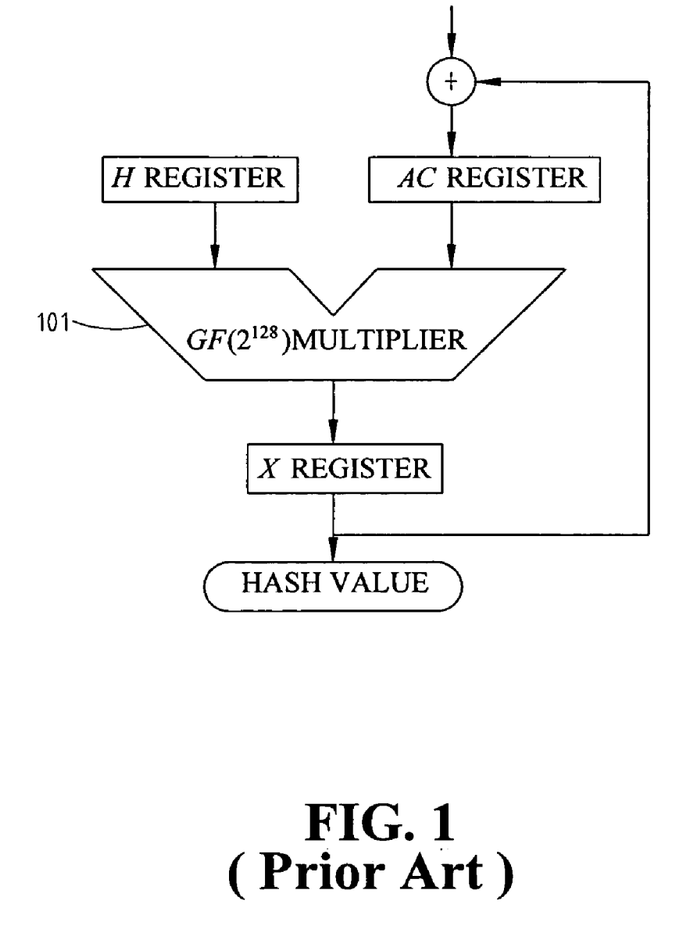
FIG. 1 shows a schematic view of an exemplary conventional hardware architecture for GHASH operation.

In equation (2), GHASH function may be realized with the hardware architecture of FIG. 1. In FIG. 1, the core of the GHASH hardware architecture is a 128-bit parallel $GF(2^{128})$ multiplier 101. The initial value of the hash value in register X is set to 0. In the first m clock cycles, the m blocks $A_1$, $A_2, \ldots, A_m^*$ are substituted into the right part of the equation one by one. Then, in the next n clock cycles, the n 128-bit blocks $C_1, C_2, \ldots, C_{n-1}, C_n$ of ciphertext C are substituted into the right part of the equation on the third line of (2). In the last cycle clock, len(A)∥len(C) is substituted into the right part of the equation of the last line of (2). By using the hardware architecture, m+n+1 clock cycles are required to compute the hash value.

As shown in FIG. 1, the temporary result $X_i$ will be XORed with the next input to AC register, and the result is feedback to the AC register to generate the next operand of $GF(2^{128})$ multiplier 101. The other operand of $GF(2^{128})$ multiplier 101 is H, which is stored in the H register.

In May 2005, D. A. McGrew et. al. disclosed the operation mode of GCM, in which a 64-bit or 128-bit block encryption is used simultaneously to provide authentication and encryption.

The papers by B. Young et. al. in June 2005 and by A. Satoh in May 2006 also disclosed a high-speed architecture to realize GCM-AES. Both architectures require m+n+1 clock cycles to execute the GHASH operation in GCM. Wherein n is the length of ciphertext and m is the length of authenticated data. The m+n+1 clock cycles may result in the latency of hardware.

Figure 2:
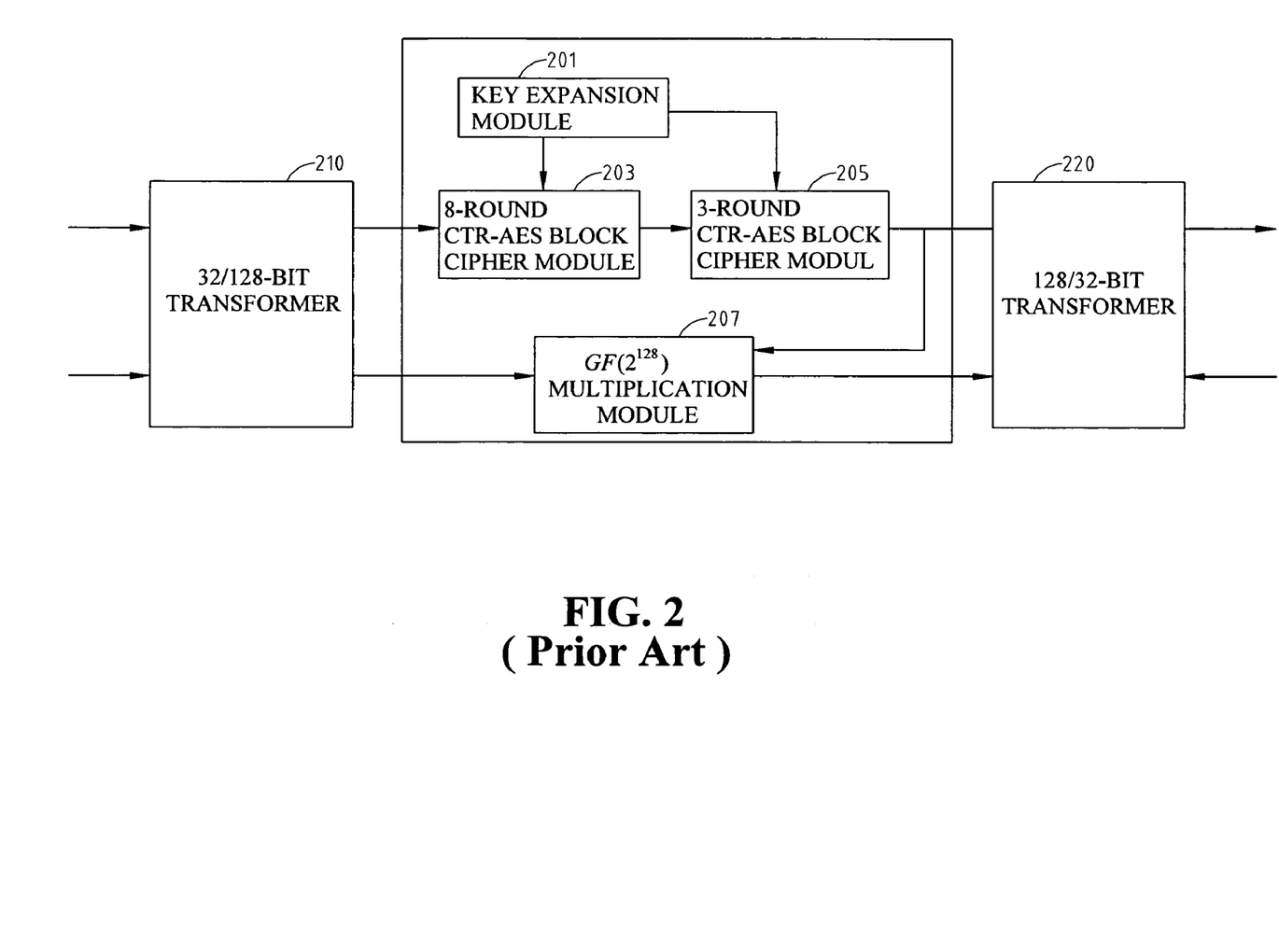
FIG. 2 shows a schematic view of an exemplary conventional low-latency GCM-AES block encryption apparatus.

U.S. Patent Publication No. 2006/0126835 disclosed a high-speed GCM-AES block cipher apparatus and method. The GCM-AES block cipher apparatus is realized with four modules, as shown in FIG. 2, namely, key expansion module 201, 8-round CTR-AES block cipher module 203, 3-round CTR-AES block cipher module 205, and $GF(2^{128})$ multiplication module 207. The data to be encrypted is from 32/128-bit transformer 210. The encrypted data is inputted to 128/32-bit transformer 220.

The block encryption apparatus may be operated in 125 MHz low clock frequency, and provide a 2-Gbps link security function of an optical line termination (OTL) and an optical network unit (ONU) of an Ethernet passive optical network (EPON).

SUMMARY OF THE INVENTION

The exemplary embodiments of the present invention may provide a low-latency method and apparatus of GHASH operation for authenticated encryption GCM. The present invention may compute the authenticated data, ciphertext and $H^{n+1}$ of GCM, and provide parallel execution of GHASH operation of GCM. The input order of authenticated data and ciphertext may be independent so that the application of GCM is more flexible. The present invention may execute GHASH operation of GCM in parallel, and require only max{m,n}+1 steps. If the ciphertext and H are invariants, only m+1 steps will be required.

In an exemplary embodiment, the present disclosure is directed to a low-latency method of GHASH operation for authenticated encryption GCM. The first step of the exemplary method may expand, according to the authenticated data, ciphertext and the HASH key H, the final output of the GHASH function as a combination of three interim values, $X_A$, $X_C$, and $H^{n+1}$, where $X_A$ is the temporary value related to authenticated data, and $X_C$ is the temporary value related to ciphertext. Then, the computation of $X_A$, $X_C$, and $H^{n+1}$ may be parallelized.

In another exemplary embodiment, the present disclosure is directed to a low-latency apparatus of GHASH operation for authenticated encryption GCM. The exemplary apparatus may include three modules to compute $X_A$, $X_C$, and $H^{n+1}$. The hardware architecture of the exemplary apparatus may be realized with three $GF(2^k)$ multipliers, three registers, and a $GF(2^k)$ addition. The addition may be realized with either XOR gate or software module.

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

GHASH function has three inputs, which are the additional authenticated data A, ciphertext C and HASH key H defined in GCM specification. Without the loss of generality, the following exemplary description may use a 128-bit block as a block encryption, the length len(A) of authenticated data A is m, and the length len(C) of ciphertext C is n. In other words, the GCM may use 128-bit block encryption to provide both authentication and encryption, and the authenticated data A and ciphertext C may be divided into m and n 128-bit blocks, respectively.

When using the conventional equation (2) to execute the GHASH operation of GCM, m+n+1 steps may be required to obtain the result of GHASH function.

Figure 3:
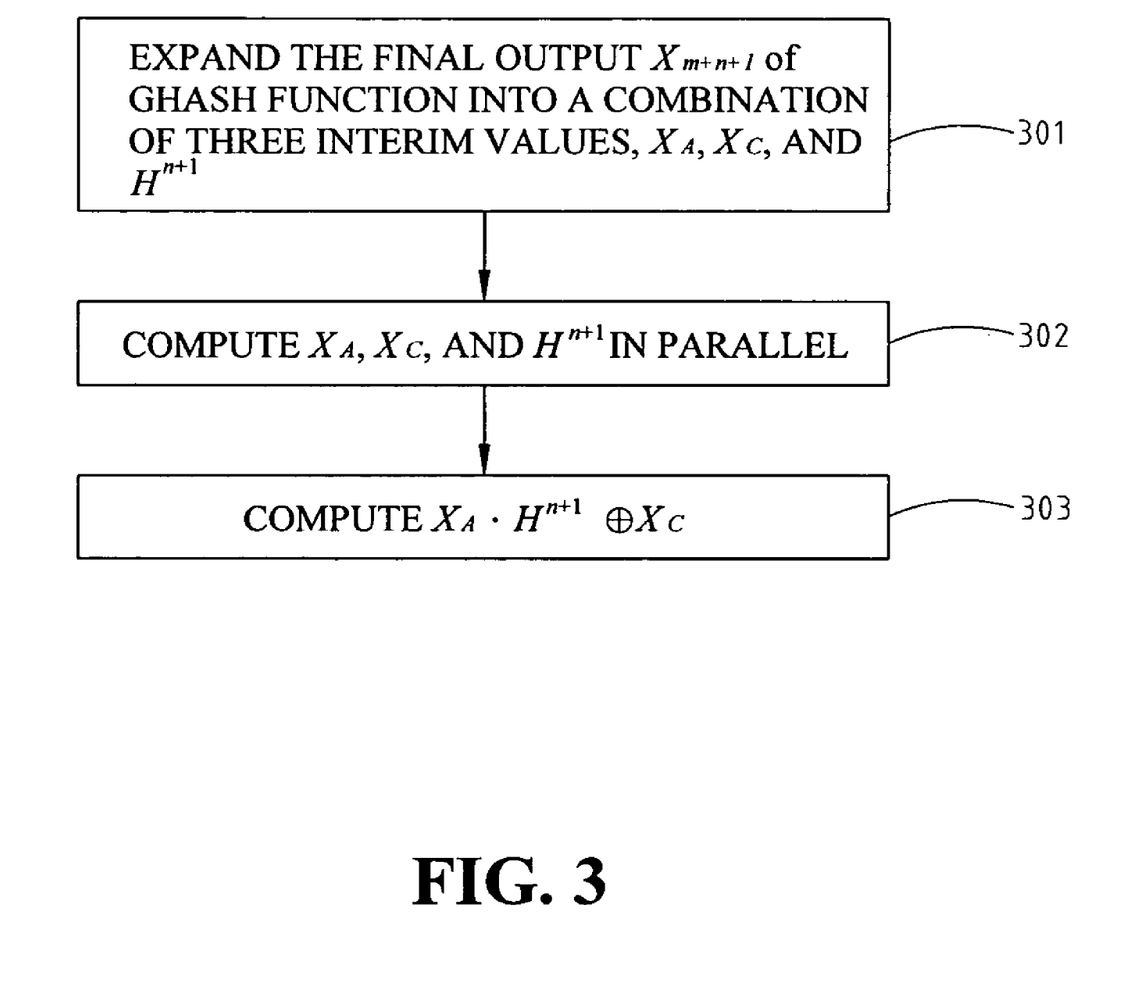
FIG. 3 shows an exemplary flowchart of a low-latency method of GHASH operation for authenticated encryption GCM, consistent with certain disclosed embodiments.

FIG. 3 shows an exemplary flowchart of a low-latency method of GHASH operation for authenticated encryption GCM, consistent with certain disclosed embodiments. Referring to the exemplary flowchart, the final output $X_{m+n+1}$ of GHASH function may be expanded into a combination of three interim values, $X_A$, $X_C$, and $H^{n+1}$, as shown in step 301.

In step 301, $X_A$ is a temporary value related to authenticated data A, and $X_C$ is a temporary value related to ciphertext C. $X_A$ is the temporary value generated by summing the product of each of the m blocks and the decreasing sequence of H, respectively, where the highest order of H is m+1. $X_C$ is the temporary value generated by summing the product of each of the m blocks and the decreasing sequence of H, respectively, where the highest order of H is n+1.

The flowing expanded equation may describe the $(m+n+1)^{th}$ output $X_{m+n+1}$ of GHASH function as a combination of the three interim values, $X_A$, $X_C$, and $H^{n+1}$.

$$X_{m+n+1} = A_1 H^{m+n+2} \oplus A_2 H^{m+n-1} \oplus \ldots \oplus (A_m^* \| S^{k-v}) H^{n+2} \oplus$$
$$C_1 H^{n+1} \oplus C_2 H^n \oplus \ldots \oplus (C_n^* \| S^{k-u}) H^2 \oplus (len(A) \| len(C)) H,$$
$$= \underbrace{(A_1 H^{m+1} \oplus A_2 H^m \oplus \ldots \oplus (A_m^* \| S^{k-v}) H) H^{n+1}}_{X_A} \oplus,$$
$$\underbrace{C_1 H^{n+1} \oplus C_2 H^n \oplus \ldots \oplus (C_n^* \| S^{k-u}) H^2 \oplus (len(A) \| len(C)) H}_{X_C}$$

where $S^l$ is a binary string of l bits, v is the length of block $A_m^*$, u is the length of $C_n^*$, k is the length of key H, and u and v are both less than or equal to k.

As shown in step 302, $X_A$, $X_C$, and $H^{n+1}$ may be computed in parallel. Step 302 includes max{m,n} sub-steps. Each sub-step has three inputs, a, b, and c. The computation of each sub-step is $(a \oplus b) \cdot c$, which requires one clock cycle. Therefore, it takes m clock cycles to compute $X_A$. On the other hand, it takes n clock cycles to compute $X_C$ and $H^{n+1}$. Therefore, it only requires max{m,n} to compute $X_A$, $X_C$, and $H^{n+1}$ in parallel.

After $X_A$, $X_C$, and $H^{n+1}$ are computed, the HASH value of GHASH operation based on $X_A$, $X_C$, and $H^{n+1}$ may be computed, that is, to compute $X_A \cdot H^{n+1} \oplus X_C$ as shown in step 303. This step requires one clock cycle. Therefore, the GHASH operation of GCM of the exemplary embodiment according to the present invention requires max{m,n}+1 clock cycles.

Figure 4:
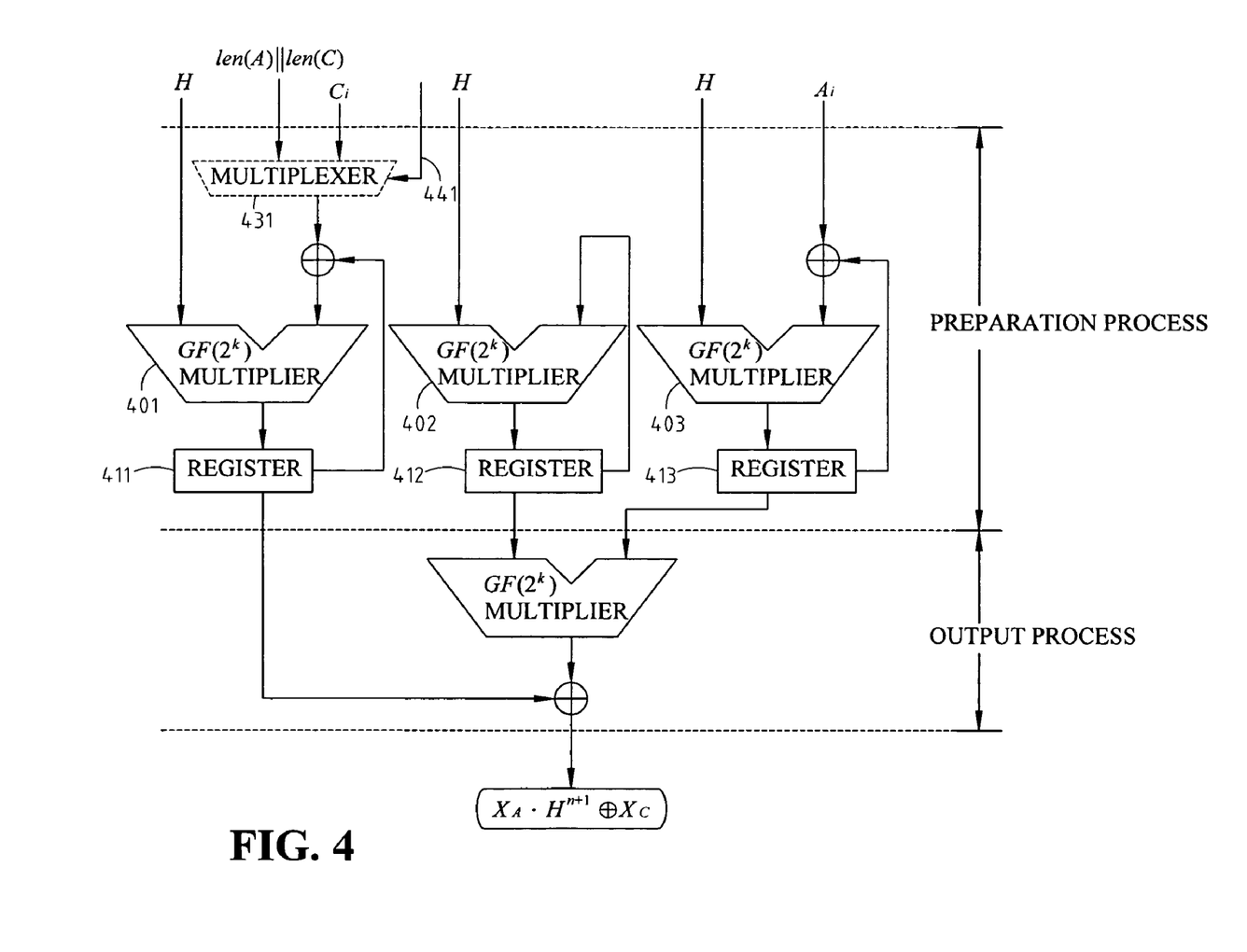
FIG. 4 shows an exemplary architecture of a low-latency apparatus of GHASH operation for authenticated encryption GCM, consistent with certain disclosed embodiments.

FIG. 4 shows an exemplary architecture of a low-latency apparatus of GHASH operation for authenticated encryption GCM, consistent with certain disclosed embodiments. The exemplary architecture of the low-latency apparatus may include three modules for computing the temporary value $X_A$ related to authenticated data A, the temporary value $X_C$ related to ciphertext C, and $H^{n+1}$. As shown in FIG. 4, the exemplary architecture of the apparatus may be realized with three $GF(2^k)$ multipliers 401-403, three registers 411-413, and a $GF(2^k)$ addition $\oplus$. Registers 411-413 may be used for storing the temporary values of $X_A$, $X_C$, and $H^{n+1}$, respectively. The initial values of register 411, 413 are the addition unit element 0 of the GF($2^k$), and the initial value of register 412 is the multiplication unit element 1 of the GF($2^k$). GF($2^k$) addition $\oplus$ may be realized with XOR gates or software modules.

In the preparation process, three GF($2^k$) multipliers 401-403 may compute the values of $X_A$, $X_C$, and $H^{n+1}$, respectively, and then input the values to register 411-413 respectively. When computing $X_C$ during the preparation process, the exemplary apparatus may use a control signal 441 to select a certain $C_i$ or len(A)||len(C) through a multiplexer 431. The GF($2^k$) addition $\oplus$ may be performed on the temporary result of $X_C$ stored in register 411 and the output of multiplexer 431, and the result is feedback to GF($2^k$) multiplier 401 to generate the next operand for GF($2^k$) multiplier 401. The other operand for GF($2^k$) multiplier 401 is H. Similarly, in computing $X_A$, the GF($2^k$) addition $\oplus$ may be performed on the temporary result of $X_A$ stored in register 413 and some $A_i$, and the result is feedback to GF($2^k$) multiplier 403 to generate the next operand for GF($2^k$) multiplier 403. The other operand for GF($2^k$) multiplier 403 is H. In computing $H^{n+1}$, the temporary result stored in register 412 is feedback to GF($2^k$) multiplier 402 to generate the next operand for GF($2^k$) multiplier 402. The other operand for GF($2^k$) multiplier 402 is H.

In the preparation process, it can be shown that authenticated data $A_i$ and ciphertext $C_i$ may be input separately and independently. Even the disordered sequence, such as $C_1 C_2 A_1 C_3 C_4 C_5 A_2 A_3 A_4 \ldots$ is acceptable.

After $X_A$, $X_C$, and $H^{n+1}$ are computed, in the output process, the exemplary apparatus may use one of three GF($2^k$) multiplier 401-403 and the GF($2^k$) addition $\oplus$ to execute the computation of $X_A \cdot H^{n+1} \oplus X_C$.

Therefore, the computation of $X_C$ may be realized through the use of a multiplexer, a GF($2^k$) multiplier, and a GF($2^k$) addition $\oplus$. The computation of $X_A$ may be realized through the use of a GF($2^k$) multiplier, and a GF($2^k$) addition $\oplus$. The preferred computation of $H^{n+1}$ may be realized through the use of a GF($2^k$) multiplexer. A GF($2^k$) multiplier may be realized by the base multiplier defined in GF($2^k$) Mastrovito's standard.

Figure 5:
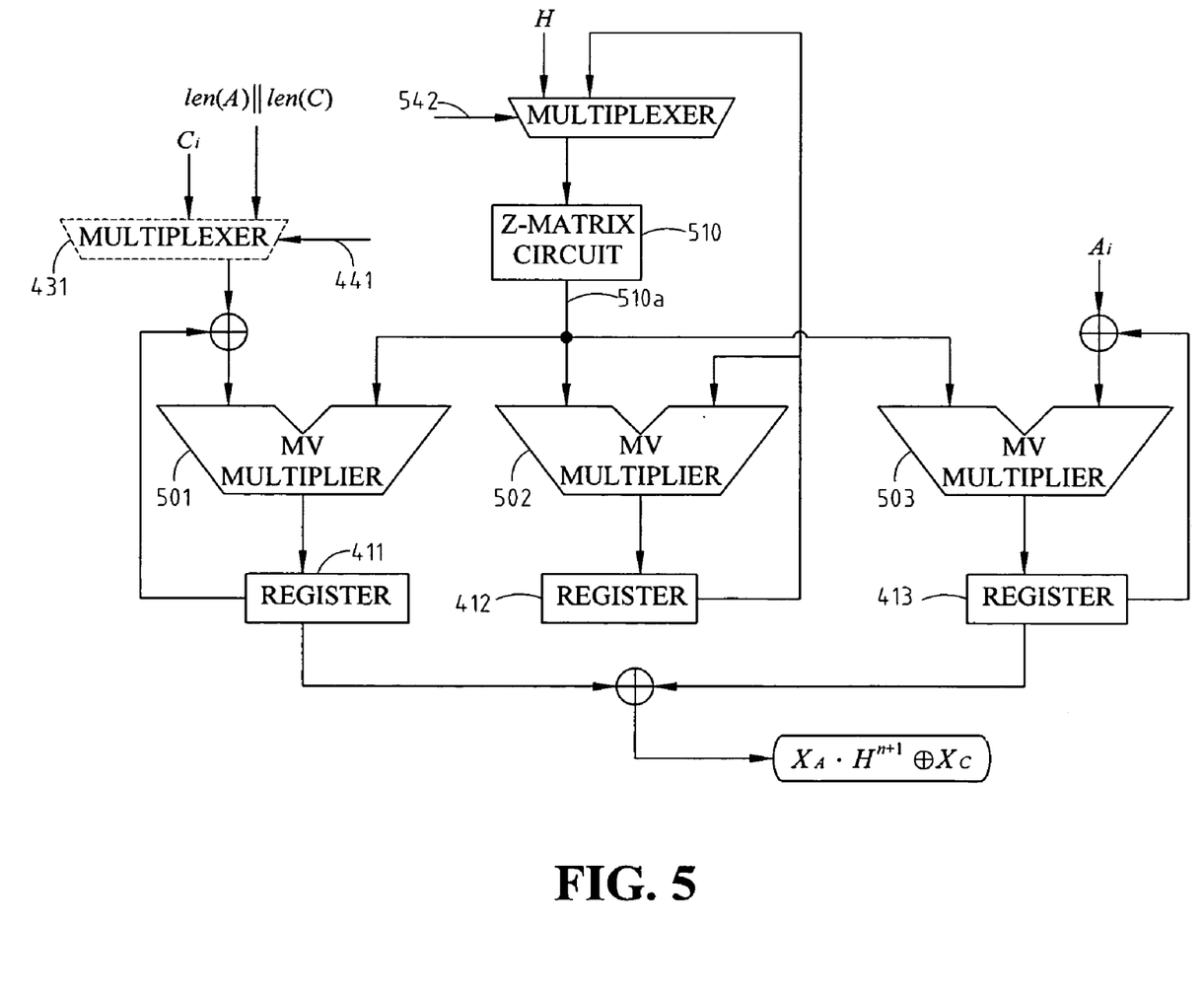
FIG. 5 shows a working example to use a Mastrovito's standard multiplier to realize the exemplary embodiment of FIG. 4.

FIG. 5 shows a working example to use a Mastrovito's standard multiplier to realize the exemplary embodiment of FIG. 4. The base multiplier defined in GF($2^k$) Mastrovito's standard is a matrix-vector (MV) multiplier. Assuming that a(x), b(x), c(x) are defined in GF($2^m$), and are polynomials constructed by generator polynomial g(x). Let r(x) be the product of a(x) and b(x). Then, the polynomial representation is as follows:

According to the coefficients in equation (3), the Mastrovito's multiplier generates equation $R = Z_a B$.

$$R = \begin{pmatrix} r_0 \\ r_1 \\ \vdots \\ r_{m-1} \end{pmatrix} = Z_a B = \begin{pmatrix} z_{0,0} & \cdots & z_{0,m-1} \\ \vdots & \ddots & \vdots \\ z_{m-1,0} & \cdots & z_{m-1,m-1} \end{pmatrix} \begin{pmatrix} b_0 \\ b_1 \\ \vdots \\ b_{m-1} \end{pmatrix} \quad (4)$$

where $Z_a$ is a m×m matrix derived by a(x) and g(x), called Z-matrix, which is expressed as follows:

$$z_{i,j} = \begin{cases} a_i & j = 0 \quad i = 0, \ldots, m-1 \\ u(i-j)a_{i-j} + \sum_{k=0}^{j-1} q_{j-1-k,i} a_{m-1-k} & j = 1, \ldots, m-1 \quad i = 0, \ldots, m-1 \end{cases}$$

in which u(x) is a step function, defined as:

$$u(x) = \begin{cases} 1 & x \geq 0 \\ 0 & x < 0 \end{cases}$$

and $q_{i,j}$ is an element of the matrix in the following equation:

$$\begin{bmatrix} x^m \\ x^{m+1} \\ \vdots \\ x^{2m-2} \end{bmatrix} \equiv \begin{bmatrix} q_{0,0} & q_{0,1} & \cdots & q_{0,m-1} \\ q_{1,0} & q_{1,1} & \cdots & q_{1,m-1} \\ \vdots & \vdots & \ddots & \vdots \\ q_{m-1,0} & q_{m-1,1} & \cdots & q_{m-1,m-1} \end{bmatrix} \begin{bmatrix} 1 \\ x \\ \vdots \\ x^{m-1} \end{bmatrix} \mod g(x)$$

According to the base multiplier of Mastrovito's standard, the working example in FIG. 5 requires max{m,n}+2 clock cycles to execute the GHASH operation in GCM. As shown in FIG. 5, the working example only requires a Z-matrix circuit 510 and three MV multipliers 501-503, and does not require three pairs of hardware circuits, where each pair of hardware circuit includes a Z-matrix circuit and an MV multiplier. In this exemplary hardware, three MV multipliers 501-503 may share a Z-matrix circuit 510 hardware resource. Z-matrix circuit 510 may be used to compute the Z-matrix 510a, described as follows.

In FIG. 5, when HASH key H is loaded into Z-matrix circuit 510, Z-matrix circuit 510 may compute matrix $Z_H$, and let three MV multipliers 501-503 compute $X_A$, $X_C$, and $H^{n+1}$ in max{m,n} clock cycles. When computing $X_A \cdot H^{n+1} \oplus X_C$, control signal 441 may be used to select a certain $C_i$ or len(A)||len(C). In the next clock cycle, i.e., the (max{m,n}+1)-th clock cycle, when authenticated data A and ciphertext C are both completely input, control signal 542 may be used to load $H^{n+1}$ into Z-matrix circuit 510, and then matrix $Z_{H^{n+1}}$ is computed. In the last clock cycle, i.e., the (max{m,n}+2)-th cycle, the result of $X_A \cdot H^{n+1} \oplus X_C$ is computed.

In the exemplary architecture according to the present invention, it is obvious that the input order of authenticated data and the ciphertext may be independent. This allows more flexibility in the GCM application. For example, in different transmissions or sessions, the change of authenticated data only requires the re-computation of $X_A$. Similarly, if the authenticated data remains the same, and the ciphertext is different, only $X_C$ and $H^{n+1}$ need to be re-computed. Furthermore, the present invention may accept disordered sequences.

From the working example realized by base multiplier of Mastrovito's standard, it is shown that the embodiments of the present application may allow the three $GF(2^k)$ multipliers to share hardware resource to reduce the hardware cost. When compared with the conventional technique that uses three $GF(2^k)$ multipliers and requires the authenticated data $A_i$ and ciphertext $C_i$ to be inputted in order, the exemplary embodiments according to the embodiments of the present application may save about 20% of resources, and therefore speed up the execution of GHASH operation of GCM.

In summary, according to the present invention, if additional authenticated data is m blocks and the ciphertext is n block, the exemplary embodiments according to the present invention only requires max{m,n}+1 steps to execute the GHASH operation in GCM. In addition, the input order of additional authenticated data and ciphertext may be independent in the present invention, which may allow more flexibility in GCM application.

The exemplary embodiments according to the present invention may be applicable to the application areas using GCM encryption mode, such as MACSec, EPON, storage devices, or IPSec.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A low-latency method of GHASH operation for Galois Counter Mode (GCM) executed in an authenticated encryption block cipher system, said GHASH operation having three inputs including authenticated data A and ciphertext C defined in said GCM, and HASH key H of said GHASH operation, said method comprising the steps of:

formulating a final output $X_{m+n+1}$ of said GHASH operation into a combination of three interim values $X_A$, $X_C$, and $H^{n+1}$, $X_A$ being an interim value related to said authenticated data A and expressed by $$X_A = A_1 H^{n+1} \oplus A_2 H^n \oplus \ldots \oplus (A_m{}^* \| S^{k-v}) H,$$

and $X_C$ being an interim value related to said ciphertext C and expressed by $$X_C = C_1 H^{n+1} \oplus C_2 H^n \oplus \ldots \oplus (C_n{}^* \| S^{k-u}) H^2 \oplus (len(A) \| len(C)) H;$$

computing values of $X_A$, $X_C$, and $H^{n+1}$ in parallel using computational units in said authenticated encryption block cipher system and completing said computing in max {m,n} computation cycles with each computation cycle being defined as a cycle of computational operations of $(a \oplus b) \cdot c$ with a, b and c being three inputs of said computational operations; and computing a HASH value of said GHASH operation according to the values of $X_A$, $X_C$, and $H^{n+1}$ using a computational unit in said authenticated encryption block cipher system;

wherein said authenticated data A is divided into m blocks represented as $A_1, A_2, \ldots, A_{m-1}, A_m{}^*$, said ciphertext C is divided into n blocks represented as $C_1, C_2, \ldots, C_{n-1}, C_n{}^*$, $S^l$ is a binary string of l bits, v, u, and k are respective length values of $A_m{}^*$, $C_n{}^*$ and H with u and v being both less than or equal to k, $H^n$ is a n-th computed value of H, len(A) and len(C) are respective length values of said authenticated data A and said ciphertext C, max {m,n} is a maximum value of m and n, $\oplus$ is an addition operation, and $\|$ is a concatenation operation.

2. The method as claimed in claim 1, wherein said $\ominus$ is realized with an exclusive or (XOR) operator.

3. The method as claimed in claim 1, wherein said $\ominus$ is realized by software.

4. The method as claimed in claim 1, wherein said HASH value of said GHASH operation is computed as $XA*H"n+1 \ominus Xc$.

5. The method as claimed in claim 1, wherein computing XA is completed in m operation cycles.

6. The method as claimed in claim 1, wherein computing Xc and H n+1 is completed in n operation cycles.

7. The method as claimed in claim 1, wherein each block of said authenticated data A and each block of said cipher text C are input separately and independently.

8. A low-latency apparatus of GHASH operation for Galois Counter Mode (GCM) authenticated encryption, said GHASH operation having three inputs including authenticated data A and ciphertext C defined in said GCM, and HASH key H of said GHASH operation, said apparatus comprising:

first, second and third computational units for computing three interim values $X_A$, $X_C$, and $H^{n+1}$ respectively and in parallel, $X_A$ being an interim value related to said authenticated data A and expressed by $$X_A = A_1 H^{n+1} \oplus A_2 H^n \oplus \ldots \oplus (A_m{}^* \| S^{k-v}) H,$$

and $X_C$ being an interim value related to said ciphertext C and expressed by $$X_C = C_1 H^{n+1} \oplus C_2 H^n \oplus \ldots \oplus (C_n{}^* \| S^{k-u}) H^2 \oplus (len(A) \| len(C)) H; \text{ and}$$

a fourth computational unit for computing a HASH value according to $X_A \cdot H^{n+1} \oplus X_C$;

wherein said first, second and third computational units complete computing values of $X_A$, $X_C$, and $H^{n+1}$ in max{m,n} computation cycles with each computation cycle being defined as a cycle of computational operations of $(a \oplus b) \cdot c$ with a, b and c being three inputs of said computational operations; and wherein said authenticated data A is divided into m blocks represented as $A_1, A_2, \ldots, A_{m-1}, A_m{}^*$, said ciphertext C is divided into n blocks represented as $C_1, C_2, \ldots, C_{n-1}, C_n{}^*$, $S^l$ is a binary string of l bits, v, u, and k are respective length values of $A_m^*$, $C_n^*$ and H with u and v being both less than or equal to k, $H''$ is a n-th computed value of H, len(A) and len(C) are respective length values of said authenticated data A and said ciphertext C, max{m, n} is a maximum value of m and n, $\oplus$ is an addition operation, and $\|$ is a concatenation operation.

9. The apparatus as claimed in claim 8, wherein each of said first and second computational units comprises a multiplier and an $\oplus$ operator for performing said computational operations of $(a\oplus b)\cdot c$, said third computational unit has a multiplier, each of said first, second and third computational units further comprises an input for receiving said HASH key H and a register for storing a respective temporary value of $X_A$, $X_C$, or $H^{n+1}$, and said fourth computational unit has a multiplier and an $\oplus$ operator for computing $X_A \cdot H^{n+1} \oplus X_C$.

10. The apparatus as claimed in claim 9, further comprising a control signal and a multiplexer for selecting len(A)$\|$len(C) or a block of said ciphertext C as another input to said second computational unit, wherein said first computational unit has another input for receiving a block of said authenticated data A.

11. The apparatus as claimed in claim 9, wherein each multiplier of said first, second, third and fourth computational unit is a multiplier defined by $GF(2^k)$, and k is an integer number.

12. The apparatus as claimed in claim 8, wherein each of said first and second computational units comprises a matrix-vector (MV) multiplier of Mastrovito's standard and an $\oplus$ operator for performing said computational operations of $(a\oplus b)\cdot c$, said third computational unit has a MV multiplier of Mastrovito's standard, each of said first, second and third computational units further comprises an input for receiving an output from a Z-matrix circuit, and a register for storing a respective temporary value of $X_A$, $X_C$, or $H^{n+1}$, and said fourth computational unit has an $\oplus$ operator for computing $X_A \cdot H^{n+1} \oplus X_C$.

13. The apparatus as claimed in claim 12, wherein the three MV multipliers of said first, second and third computational units share said Z-matrix circuit to implement multipliers defined by $GF(2^k)$, and k is an integer number.

14. The apparatus as claimed in claim 12, further comprising a first control signal and a first multiplexer for selecting len(A)$\|$len(C) or a block of said ciphertext C as another input to said second computational unit, and a second control signal and a second multiplexer for selecting said HASH key H or $H^{n+1}$ from said register of said third computational unit as an input to said Z-matrix circuit, wherein said first computational unit has another input for receiving a block of said authenticated data A.

15. The apparatus as claimed in claim 14, wherein after said authenticated data A and said ciphertext C are input completely, said apparatus applies said second control signal to load $H^{n+1}$ into said Z-matrix circuit, and computes a matrix $Z_{H^{n+1}}$.

16. The apparatus as claimed in claim 12, wherein said Z-matrix circuit computes a matrix $Z_H$ when said HASH key H is loaded into said Z-matrix circuit.

* * * * *